(12) United States Patent　　(10) Patent No.: US 11,347,088 B2
Chen et al.　　(45) Date of Patent: May 31, 2022

(54) ANTI-PEEP STRUCTURE, METHOD FOR MANUFACTURING ANTI-PEEP STRUCTURE, AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Dongchuan Chen, Beijing (CN); Xueqiang Qian, Beijing (CN); Bingyang Liu, Beijing (CN); Dan Wang, Beijing (CN); Xinli Ma, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 177 days.

(21) Appl. No.: 16/532,676

(22) Filed: Aug. 6, 2019

(65) Prior Publication Data

US 2020/0050032 A1　Feb. 13, 2020

(30) Foreign Application Priority Data

Aug. 7, 2018　(CN) .......................... 201810890138.1

(51) Int. Cl.
*G02F 1/13*　(2006.01)
*G02F 1/13357*　(2006.01)
*G02F 1/1335*　(2006.01)

(52) U.S. Cl.
CPC ...... *G02F 1/1323* (2013.01); *G02F 1/133606* (2013.01); *G02F 1/133607* (2021.01)

(58) Field of Classification Search
None
See application file for complete search history.

(56) References Cited

U.S. PATENT DOCUMENTS

2014/0232960 A1\* 8/2014 Schwartz ................ B32B 27/06
　　　　　　　　　　　　　　　　　349/12

FOREIGN PATENT DOCUMENTS

| CN | 102717549 A | 10/2012 |
| CN | 103091883 A | 5/2013 |
| CN | 105629534 A | 6/2016 |

(Continued)

OTHER PUBLICATIONS

First Office Action dated Dec. 25, 2020 for application No. CN 201810890138.1 with English translation attached.

*Primary Examiner* — Thanh Nhan P Nguyen
(74) *Attorney, Agent, or Firm* — Nath, Goldberg & Meyer; Joshua B. Goldberg (57) ABSTRACT

An anti-peep structure, a method for manufacturing an anti-peep structure, and a display device are provided. The anti-peep structure includes a substrate made of a first material having a first refractive index, the substrate including a light incident surface and a light outgoing surface disposed opposite to each other, where a plurality of grooves are disposed in the substrate at a side of the light incident surface or the light outgoing surface; a second material having a second refractive index disposed in the plurality of grooves; and a refractive index regulating component configured to control the second refractive index; where a viewing angle at the light outgoing surface is determined by a difference between the first refractive index and the second refractive index.

16 Claims, 7 Drawing Sheets

(56) References Cited

FOREIGN PATENT DOCUMENTS

| | | |
|---|---|---|
| CN | 205720964 U | 11/2016 |
| CN | 207249283 U | 4/2018 |
| WO | 2015185083 A1 | 12/2015 |

* cited by examiner

ANTI-PEEP STRUCTURE, METHOD FOR MANUFACTURING ANTI-PEEP STRUCTURE, AND DISPLAY DEVICE

CROSS-REFERENCE TO RELATED APPLICATIONS

The present application claims the priority of the Chinese Patent Application No. 201810890138.1 filed on Aug. 7, 2018, the contents of which are incorporated herein by reference in its entirety.

TECHNICAL FIELD

The present disclosure relates to the field of display technology, and particularly relates to an anti-peep structure, a method for manufacturing an anti-peep structure, and a display device.

BACKGROUND

With the development of technology, portable display devices are becoming more and more popular. For example, while taking or waiting for a bus, people usually read, learn or exchange text messages through mobile phones or tablets. However, with so many people around, contents displayed on a mobile phone or tablet may be glimpsed by a person nearby. As a result, private information may be leaked out, thereby failing to protect privacy and causing inconvenience to the user.

SUMMARY

According to an aspect of the present disclosure, there is provided an anti-peep structure, including: a substrate made of a first material having a first refractive index, the substrate including a light incident surface and a light outgoing surface disposed opposite to each other, a plurality of grooves are disposed in the substrate at a side of the light incident surface or the light outgoing surface; a second material having a second refractive index disposed in the plurality of grooves; and a refractive index regulating component configured to control the second refractive index; a viewing angle at the light outgoing surface is determined by a difference between the first refractive index and the second refractive index.

In an embodiment, projections of the plurality of grooves on the light outgoing surface are parallel to each other.

In an embodiment, in a direction that the plurality of grooves are sequentially arranged, any one of the plurality of grooves has a dimension ranging from 30 nm to 210 nm, and a distance between any adjacent grooves of the plurality of grooves ranges from 20 nm to 200 nm; and in a direction perpendicular to the light outgoing surface, any one of the plurality of grooves has a dimension ranging from 50 µm to 200 µm.

In an embodiment, the first material includes any one of an acrylic material, polyethylene terephthalate (PET), and glass.

In an embodiment, the second material includes a liquid crystal material.

In an embodiment, the refractive index regulating component includes a first transparent electrode and a second transparent electrode respectively disposed at a side of the light incident surface and a side of the light outgoing surface of the substrate; and the second refractive index is determined by a voltage between the first transparent electrode and the second transparent electrode.

In an embodiment, an enclosed structure is formed by the plurality of grooves and one of the first transparent electrode and the second transparent electrode to seal the second material.

In an embodiment, the first refractive index ranges from 1.2 to 3.5; and the difference between the first refractive index and the second refractive index ranges from 0 to 2.

In an embodiment, the plurality of grooves are disposed on the light incident surface of the substrate.

According to another aspect of the present disclosure, there is provided a display device including the anti-peep structure according to any of the above embodiments and a display screen, where the anti-peep structure is attached to the display screen.

In an embodiment, the anti-peep structure is attached to the display screen along an upward and downward direction of the display screen in which the plurality of grooves are sequentially arranged.

According to yet another aspect of the present disclosure, there is provided a method for manufacturing an anti-peep structure, the method including: forming a plurality of grooves in a substrate at a first side where a light incident surface or a light outgoing surface is located, the substrate being made of a first material having a first refractive index; filling the plurality of grooves with a second material having a second refractive index; and forming a refractive index regulating component; where the refractive index regulating component is configured to control the second refractive index, and a viewing angle at the light outgoing surface is determined by a difference between the first refractive index and the second refractive index.

In an embodiment, projections of the plurality of grooves on the light outgoing surface are parallel to each other; and in a direction that the plurality of grooves are sequentially arranged, any one of the plurality of grooves has a dimension ranging from 30 nm to 210 nm, and a distance between any two adjacent grooves of the plurality of grooves ranges from 20 nm to 200 nm; and in a direction perpendicular to the light outgoing surface, any one of the plurality of grooves has a dimension ranging from 50 µm to 200 µm.

In an embodiment, the first material includes any one of an acrylic material, PET, and glass; and the second material includes a liquid crystal material.

In an embodiment, forming the plurality of grooves in the substrate at the first side where the light incident surface or the light outgoing surface is located includes: forming the plurality of grooves on the light incident surface or the light outgoing surface by a Nano-imprint process.

In an embodiment, filling the plurality of grooves with the second material includes: filling the plurality of grooves with the second material by a vacuum drip irrigation process.

In an embodiment, forming the refractive index regulating component includes: forming a first transparent electrode on the substrate to seal the second material; and forming a second transparent electrode on the substrate at a second side opposite to the first side.

In an embodiment, a material of the first transparent electrode and the second transparent electrode is indium tin oxide (ITO).

According to another aspect of the present disclosure, there is provided a method for manufacturing an anti-peep structure, the method including: forming a first transparent electrode on a substrate at a first side, the substrate being made of a first material having a first refractive index;

forming a plurality of grooves in the substrate at a second side opposite to the first side; filling the plurality of grooves with a second material having a second refractive index; and forming a second transparent electrode on the substrate to seal the second material; where the first transparent electrode and the second transparent electrode are configured to generate an electric field to control the second refractive index, and a viewing angle of the anti-peep structure is determined by a difference between the first refractive index and the second refractive index.

In an embodiment, projections of the plurality of grooves on a surface where the first transparent electrode is located are parallel to each other; and in a direction that the plurality of grooves are sequentially arranged, any one of the plurality of grooves has a dimension ranging from 30 nm to 210 nm, and a distance between any two adjacent grooves of the plurality of grooves ranges from 20 nm to 200 nm; and in a direction perpendicular to the surface where the first transparent electrode is located, any one of the plurality of grooves has a dimension ranging from 50 μm to 200 μm.

DETAILED DESCRIPTION

For better understanding of the technical solutions of the present disclosure by those skilled in the art, this disclosure will be further described in detail below with reference to the drawings and specific embodiments.

With the development of terminal technology, people can read, learn or communicate anytime and anywhere through mobile phones or tablets. However, in some public places, such as on subways, contents displayed on a user terminal may be glimpsed by a person nearby, which may lead to private information leaks. Some solutions provided by existing methods, i.e., attaching a privacy filter on the display of the terminal to protect privacy, have some disadvantages. For example, an anti-peep angle of the privacy filter is fixed, and cannot be adjusted for different usage scenarios.

Figure 1:
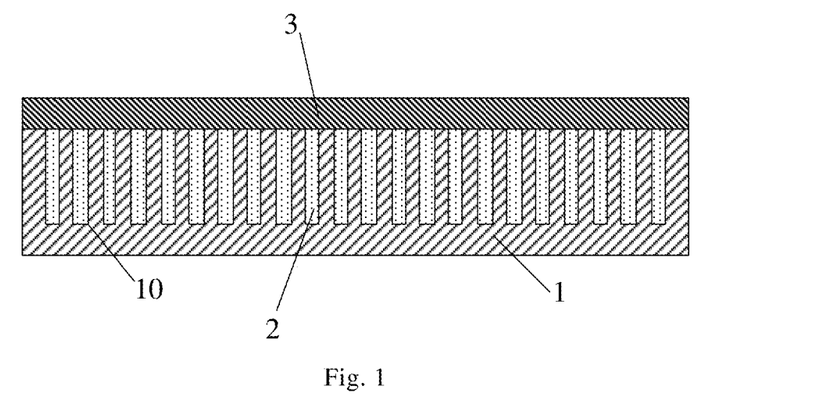
FIG. 1 is a schematic cross-sectional view of an anti-peep structure provided by an embodiment of the present disclosure.

In an embodiment of the present disclosure, there is provided an anti-peep structure having a viewing angle adjustable based on a principle of optical waveguide of two-dimensional photonic crystals. As shown in FIG. 1, the anti-peep structure may include: a substrate 1 made of a first material having a first refractive index, the substrate 1 including a light incident surface and a light outgoing surface disposed opposite to each other, where a plurality of grooves 10 are disposed in the substrate at a side of the light incident surface or the light outgoing surface; a second material 2 having a second refractive index disposed in the plurality of grooves 10; and a refractive index regulating component 3 for controlling the second refractive index; where a viewing angle at the light outgoing surface is determined by a difference between the first refractive index and the second refractive index.

The anti-peep structure provided by this embodiment of the present disclosure adopts a structure in which the first material having the first refractive index and the second material 2 having the second refractive index are arranged in an xy-dimension (two-dimension). The difference between the second refractive index of the second material 2 and the first refractive index is controlled by the refractive index regulating component 3 so that a strength of the two-dimensional photonic crystal effect between the first material and the second material 2 is variable, thereby changing the viewing angle of the anti-peep structure. The anti-peep structure provided by this embodiment of the present disclosure can achieve a viewing angle within a range of ±5° to ±90°.

Figure 2:
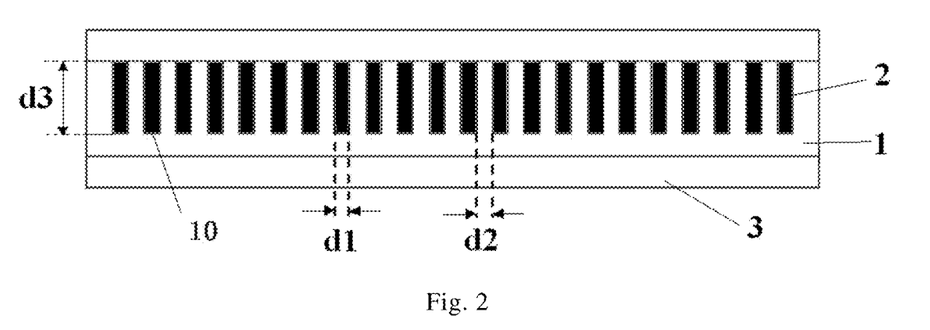
FIG. 2 is a schematic cross-sectional view of an anti-peep structure provided by an embodiment of the present disclosure.

The photonic crystal effect refers to an optical phenomenon which occurs when mediums having different refractive indexes are arranged periodically and sizes of the mediums are in the same order of magnitude as an incident light wavelength, which essentially belongs to interference and diffraction phenomenon. Therefore, in order to fully realize the photonic crystal effect, according to an embodiment of the present disclosure, projections of the plurality of grooves 10 on the light outgoing surface may be parallel to each other. As shown in FIG. 2, in an arrangement direction of the plurality of grooves 10, any one of the plurality of grooves 10 may have a dimension ranging from 30 nm to 210 nm, and a distance between any adjacent grooves 10 of the plurality of grooves 10 may range from 20 nm to 200 nm; and in a direction perpendicular to the light outgoing surface, any one of the plurality of grooves 10 may have a dimension ranging from 50 μm to 200 μm.

In addition, according to an embodiment of the present disclosure, the specific shape or dimension of each of the plurality of grooves 10, or the arrangement of the plurality of grooves 10 is not limited, as long as these parameters meet the requirements of generating the photonic crystal effect.

According to an embodiment of the present disclosure, in order to fully realize the photonic crystal effect, the difference between the first refractive index and the second refractive index may range from 0 to 2. Accordingly, in order to facilitate a certain difference from the second refractive index, and thus facilitate control of the viewing angle, the first refractive index may range from 1.2 to 3.5. In an implementation, a material of the substrate 1 may include any one of an acrylic material, PET, and glass.

In an implementation, a resin transparent material (a kind of acrylic materials) may be selected to fabricate the substrate 1. The resin transparent material not only has characteristics such as good light transmittance and easy formability, but also can form grooves on a surface thereof easily via a corresponding process.

According to an embodiment of the present disclosure, the material of the substrate 1 is not particularly limited, as long as the material of the substrate 1 is transparent and does not affect normal projection of light.

According to an embodiment of the present disclosure, the second material 2 may include a liquid crystal material. Under different voltages, the liquid crystal polymer material may have different refractive indexes so that it is possible to control the difference between the first refractive index and the second refractive index by controlling the second refractive index of the liquid crystal polymer material, thereby changing the strength of the photonic crystal effect between the substrate 1 and the liquid crystal polymer material, and thus controlling the viewing angle of the light outgoing surface of the substrate 1.

According to an embodiment of the present disclosure, the second material 2 is not particularly limited, as long as its refractive index is variable according to the applied voltages.

Figure 3:
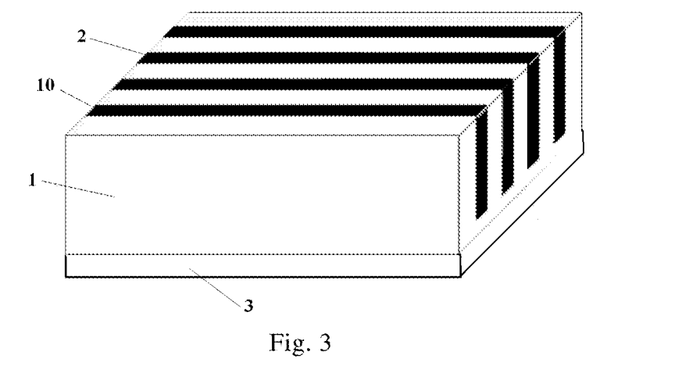
FIG. 3 is a schematic stereoscopic view of an anti-peep structure provided by an embodiment of the present disclosure.

According to an embodiment of the present disclosure, in order to generate an electric field to achieve control of the second refractive index of the second material 2, as shown in FIG. 3, the refractive index regulating component 3 may include a transparent electrode, i.e., a voltage may be applied to the second material 2 through the transparent electrode, thereby controlling the difference between the first refractive index and the second refractive index, changing the strength of the photonic crystal effect between the substrate 1 and the second material 2, and realizing control of the viewing angle.

Figure 4:
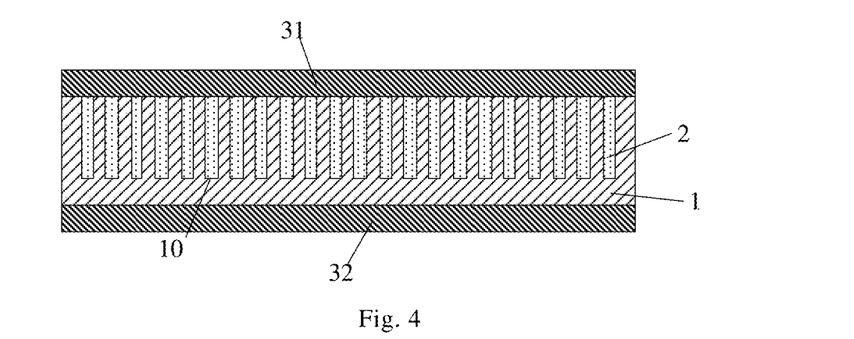
FIG. 4 is a schematic cross-sectional view of an anti-peep structure provided by an embodiment of the present disclosure.

According to an embodiment of the present disclosure, as shown in FIG. 4, the transparent electrode may include a first transparent electrode 31 and a second transparent electrode 32 respectively disposed on two opposite sides of the substrate 1. Applying different voltages between the first transparent electrode 31 and the second transparent electrode 32 may cause different degrees of deflection of the crystals in the second material 2, thereby generating different refractive indexes and thus achieving control of the second refractive index.

According to an embodiment of the present disclosure, the first transparent electrode 31 and the second transparent electrode 32 may be made of an Indium Tin Oxide (ITO) transparent conductive material. According to an embodiment of the present disclosure, the first transparent electrode 31 and the second transparent electrode 32 may be plate electrodes or strip electrodes.

According to an embodiment of the present disclosure, the materials and shapes of the first transparent electrode 31 and the second transparent electrode 32 are not particularly limited, as long as they can change the voltage of the electric field where the second material 2 is located.

According to an embodiment of the present disclosure, a transparent electrode on a side of the substrate 1 having the plurality of grooves 10 may enclose closed structures with the plurality of grooves 10 for sealing the second material 2. For example, the first transparent electrode 31 in FIG. 4 and the plurality of grooves 10 enclose the closed structures for sealing the liquid crystal polymer material.

Figure 5:
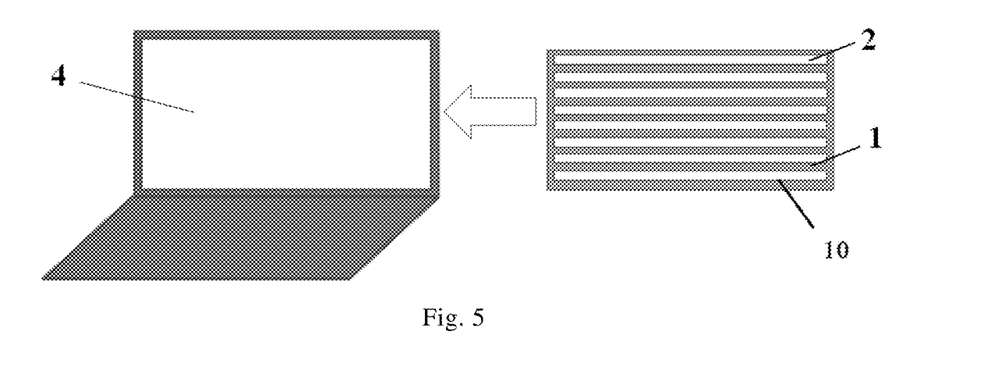
FIG. 5 is a schematic structural view of a display device provided by an embodiment of the present disclosure.

According to an embodiment of the present disclosure, a perpendicular line of a surface where the viewing angle at the light outgoing surface of the substrate 1 is located is parallel to the arrangement direction of the plurality of grooves 10, and a center line of the viewing angle is perpendicular to the light outgoing surface of the substrate 1. That is, the direction of the viewing angle of the anti-peep structure provided in this embodiment of the present disclosure is determined by the arrangement direction of the plurality of grooves. Therefore, as shown in FIG. 5, when the anti-peep structure provided in this embodiment of the present disclosure is attached to a display screen of a display device along an upward and downward direction of the display screen according to the arrangement direction of the plurality of grooves, control of the viewing angle in a left and right direction of the display screen is achieved, i.e., an anti-peep effect in the left and right direction of a terminal is achieved.

The anti-peeping effect of the anti-peep structure provided by the embodiments of the present disclosure will be described below by way of example.

Figure 6:
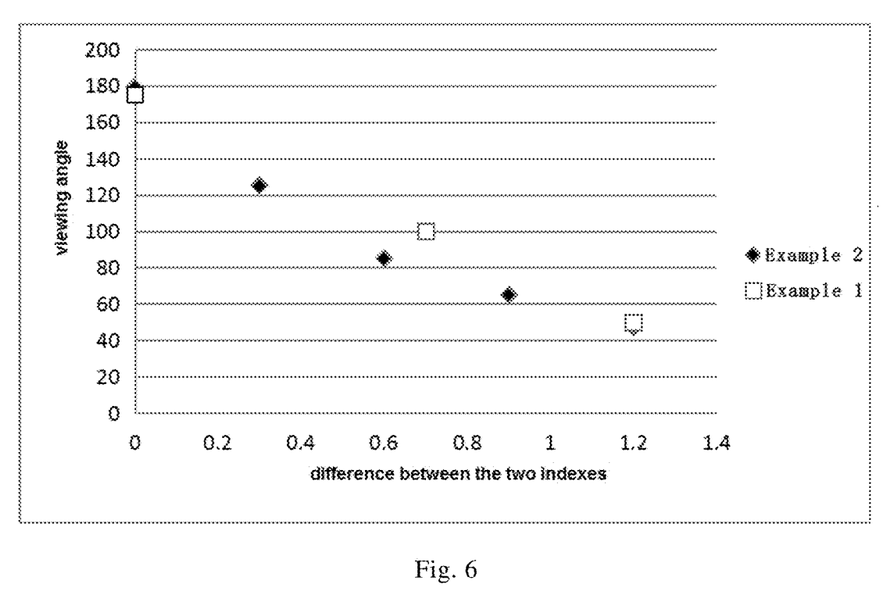
FIG. 6 is a statistical view of test results of a viewing angle of the anti-peep structure provided by an embodiment of the present disclosure.

In an Example 1, any one of the plurality of grooves 10 has a dimension d1 of 135 nm in the arrangement direction of the plurality of grooves 10, any adjacent grooves of the plurality of grooves have a distance d2 of 150 nm in the arrangement direction of the plurality of grooves 10, and any one of the plurality of grooves 10 has a dimension d3 of 95 μm in the direction perpendicular to the light outgoing surface. The viewing angle of the anti-peep structure is tested when the difference between the first refractive index and the second refractive index is: 0, 0.7, and 1.2, respectively, and the test results are as shown in FIG. 6. It should be noted that when the user directly faces the anti-peep structure, the viewing angle is 20°, which means that the left-right viewing angle is 20°. Taking a vertical normal (an imaginary vertical line which goes through the center of the anti-peep structure) of the light outgoing surface of the anti-peep structure as the standard, within a range of 10° to the left and 10° to the right (i.e., ±10°) of the vertical normal, the exiting light of the anti-peep structure is normally visible. Likewise, a viewing angle of 180° means that the left-right viewing angle is 180°; that is, taking the vertical normal of the light outgoing surface of the anti-peep structure as the standard, within a range of 90° to the left and 90° to the right (i.e., ±90°) of the vertical normal, the exiting light of the anti-peep structure is normally visible.

Figure 7A:
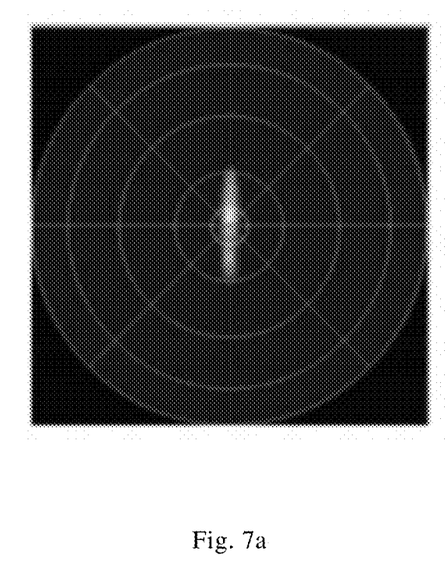
FIG. 7a is a spot test pattern of the viewing angle of the anti-peep structure provided by an embodiment of the present disclosure.
Figure 7B:
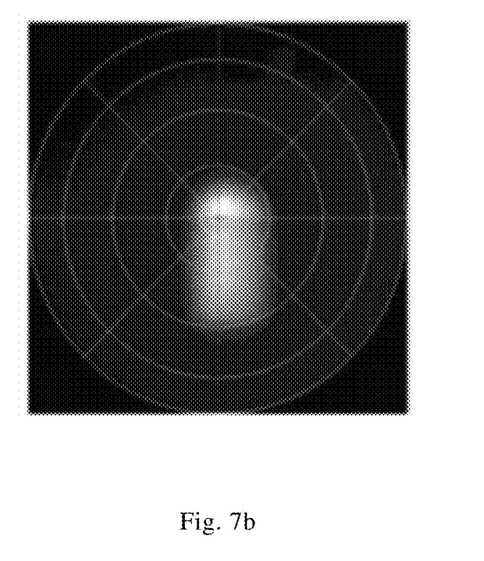
FIG. 7b is a spot test pattern of the viewing angle of the anti-peep structure provided by an embodiment of the present disclosure.
Figure 7C:
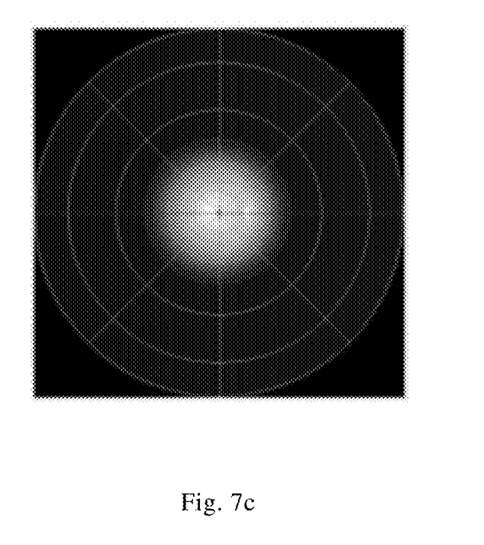
FIG. 7c is a spot test pattern of the viewing angle of the anti-peep structure provided by an embodiment of the present disclosure.

For the anti-peep structure in the Example 1, spot test results of the viewing angle, with the difference between the first refractive index and the second refractive index being 0, 0.7, and 1.2, respectively, are as shown in FIGS. 7a to 7c. FIG. 7a shows a spot test result of a viewing angle of the anti-peep structure being 50°, when the difference between the first refractive index and the second refractive index is 1.2; FIG. 7b shows a spot test result of a viewing angle of the anti-peep structure being 100°, when the difference between the first refractive index and the second refractive index is 0.7; and FIG. 7c shows a spot test result of a viewing angle of the anti-peep structure being 175°, when the difference between the first refractive index and the second refractive index is 0.

In an Example 2, any one of the plurality of grooves 10 has a dimension d1 of 135 nm in the arrangement direction of the plurality of grooves 10, any adjacent grooves of the plurality of grooves have a distance d2 of 150 nm in the arrangement direction of the plurality of grooves 10, and any one of the plurality of grooves 10 has a dimension d3 of 95 μm in the direction perpendicular to the light outgoing surface. When the difference between the first refractive index and the second refractive index is 0, 0.3, 0.6, 0.9 and 1.2, respectively, Finite Difference Time Domain (FDTD) software is used to simulate the viewing angle of the anti-peep structure provided by this embodiment of the present disclosure. The simulated results are shown in FIG. 6. It can be seen that the anti-peep structure of this embodiment can achieve control of the viewing angle via controlling the difference between the second refractive index of the second materials 2 and the first refractive index.

In the drawings corresponding to various embodiments of the present disclosure, the size, thickness, and the like of each structural layer are merely for illustration and not limitation. In a process implementation, projected areas of respective structural layers on the substrate may be the same or not, and the required projected area of each structural layer may be achieved by an etching process. Meanwhile, the structures as shown in the drawings are not used to limit the geometrical shape of each structural layer. For example, the geometrical shape of each structural layer may be a rectangle as shown in the figures, or may be a trapezoid or other shapes.

Figure 8:
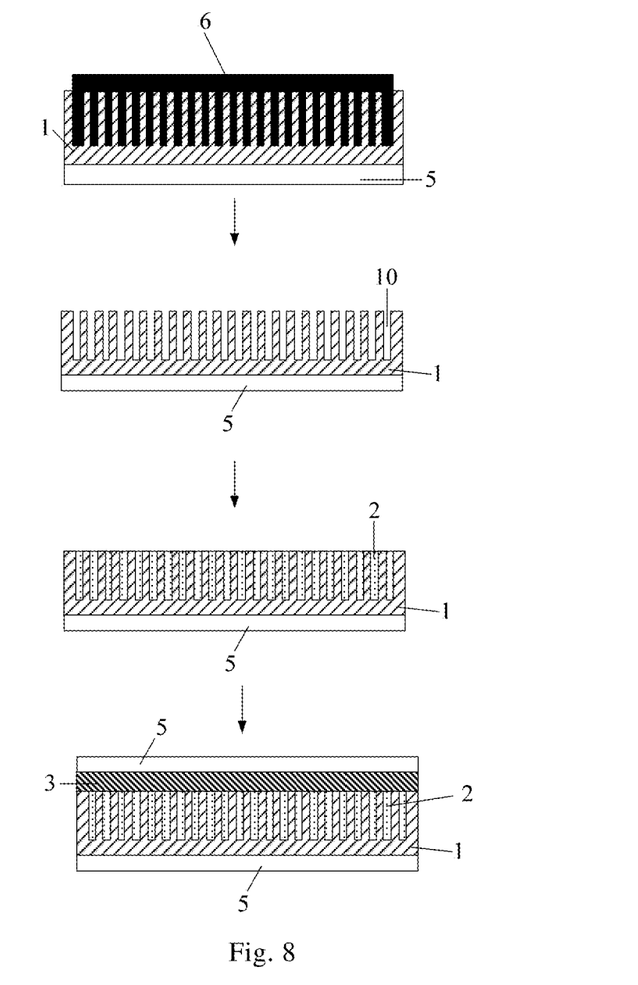
FIG. 8 is a schematic diagram illustrating a method for manufacturing an anti-peep structure provided by an embodiment of the present disclosure.
Figure 9:
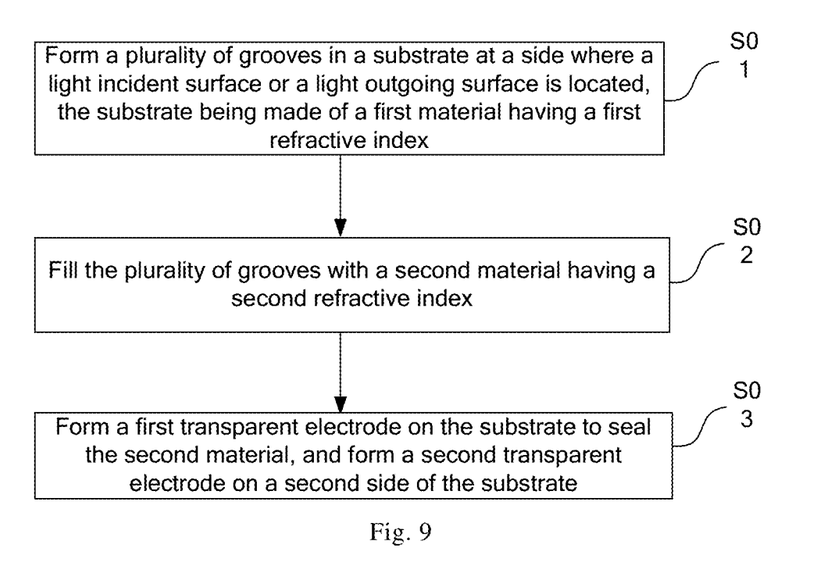
FIG. 9 is a flowchart of a method for manufacturing an anti-peep structure provided by an embodiment of the present disclosure.
Figure 10:
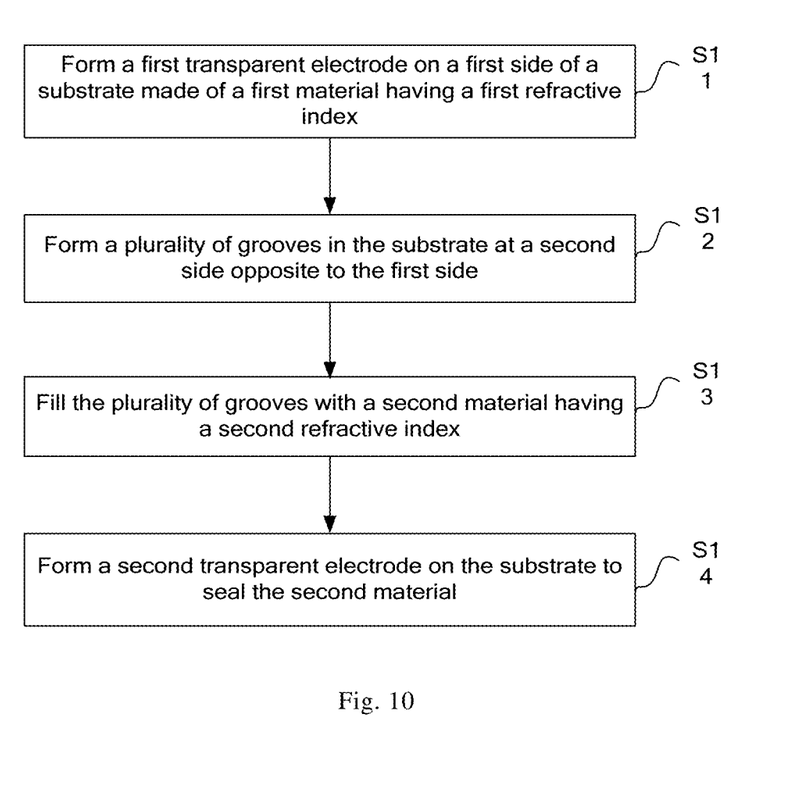
FIG. 10 is a flowchart of a method for manufacturing an anti-peep structure provided by an embodiment of the present disclosure.

In an embodiment of the present disclosure, there is further provided a method for manufacturing the anti-peep structure in the above embodiments. As shown in FIG. 8, the method may include steps S01-S03.

In the step S01, a plurality of grooves 10 are formed on a first side of a substrate 1 where a light incident surface or a light outgoing surface is located, where the substrate 1 is made of a first material having a first refractive index, and includes the light incident surface and the light outgoing surface disposed opposite to each other.

According to an embodiment of the present disclosure, the substrate 1 may be formed on a base substrate 5, or may be directly formed on other panels.

According to an embodiment of the present disclosure, the substrate 1 may be formed of a transparent material. The transparent material herein may include any one of an acrylic material, PET, and glass. In an implementation, a resin transparent material may be selected to fabricate the substrate 1. The resin transparent material not only has characteristics such as good light transmittance and easy formability, but also can form grooves on a surface thereof easily by a corresponding process.

In an implementation, a resin transparent material having a refractive index ranging from 1.2 to 3.5 may be selected so as to form a certain difference from the second refractive index of the second material 2, thereby facilitating control of the viewing angle. For example, as shown in FIG. 8, an ultraviolet curable resin transparent material may be applied onto the base substrate 5 and then be photo-cured.

According to an embodiment of the present disclosure, the step S02 may specifically include: forming the plurality of grooves 10 on the light incident surface or the light outgoing surface via a Nano-imprint process. In an implementation, as shown in FIG. 8, the nanoscale grooves 10 may be imprinted on the photo-cured resin transparent material using an imprint template 6.

According to an embodiment of the present disclosure, projections of the plurality of grooves 10 on the light outgoing surface may be parallel to each other; in an arrangement direction of the plurality of grooves 10, any one of the plurality of grooves 10 may have a dimension ranging from 30 nm to 210 nm, and a distance between any adjacent grooves 10 of the plurality of grooves 10 may range from 20 nm to 200 nm; and in a direction perpendicular to the light outgoing surface, any one of the plurality of grooves 10 may have a dimension ranging from 50 μm to 200 μm.

In the step S02, the plurality of grooves 10 are filled with a second material 2 having a second refractive index.

According to an embodiment of the present disclosure, the step S02 may specifically include: filling each of the plurality of grooves 10 with the second material via a vacuum drip irrigation process.

According to an embodiment of the present disclosure, the second material 2 may include a liquid crystal material.

In the step S03, a refractive index regulating component 3 is formed; where the refractive index regulating component 3 is configured to control the second refractive index, and a viewing angle at the light outgoing surface of the substrate 1 is determined by a difference between the first refractive index and the second refractive index.

According to an embodiment of the present disclosure, after forming the plurality of grooves 10 on the light incident surface or the light outgoing surface of the substrate 1 in the step S01, a transparent electrode as the refractive index regulating component 3 may be formed on the plurality of grooves 10 so that the transparent electrode and the plurality of grooves enclose closed structures; and then the second material 2 is filled into the closed structures via vacuum drip irrigation.

According to an embodiment of the present disclosure, forming the refractive index regulating component 3 may include forming a first transparent electrode on the substrate 1 for sealing the second material 2, and forming a second transparent electrode on a second side of the substrate 1.

The method for manufacturing an anti-peep structure of the embodiment is simple, convenient, and easy to industrialize.

In an embodiment of the present disclosure, there is further provided another method for manufacturing the anti-peep structure, which may include steps S11-S14.

In the step S11, a first transparent electrode is formed on a first side of a substrate made of a first material having a first refractive index.

In the step S12, a plurality of grooves are formed in the substrate at a second side opposite to the first side.

According to an embodiment of the present disclosure, forming the plurality of grooves on the second side of the substrate opposite to the first side in the step S12 may include: forming the plurality of grooves on the substrate via a Nano-imprint process.

According to an embodiment of the present disclosure, projections of the plurality of grooves on the first transparent electrode may be parallel to each other; in an arrangement direction of the plurality of grooves, any one of the plurality of grooves may have a dimension ranging from 30 nm to 210 nm, and a distance between any adjacent grooves of the plurality of grooves may range from 20 nm to 200 nm; and in a direction perpendicular to the first transparent electrode, any one of the plurality of grooves may have a dimension ranging from 50 μm to 200 μm.

In the step S13, the plurality of grooves are filled with a second material having a second refractive index.

According to an embodiment of the present disclosure, filling the plurality of grooves with the second material having the second refractive index in the step S13 may include filling each of the plurality of grooves 10 with the second material via a vacuum drip irrigation process.

In step S14, a second transparent electrode is formed on the substrate.

The first transparent electrode and the second transparent electrode are configured to generate an electric field to control the second refractive index, and a viewing angle of the anti-peep structure is determined by a difference between the first refractive index and the second refractive index.

According to an embodiment of the present disclosure, after the step S12, the step S14 may be first performed to form the second transparent electrode on the substrate so that the second transparent electrode and the plurality of grooves enclose closed structures, and then step S13 is performed to fill the second material into the closed structures via vacuum drip irrigation.

In an embodiment of the present disclosure, there is further provided a display device. As shown in FIG. 5, the display device includes a display screen 4 on which an anti-peep structure according to the embodiments of the present disclosure is provided.

According to an embodiment of the present disclosure, the anti-peep structure is attached to the display screen 4 along an upward and downward direction of the display screen 4 according to the arrangement direction of the plurality of grooves 10, thus achieving control of the viewing angle in a left and right direction of the display screen 4. That is, an anti-peep effect in the left and right direction of the display device is achieved. Specifically, a difference between the second refractive index of the second material 2 and the first refractive index is controlled via the refractive index regulating component so that a strength of the photonic crystal effect between the substrate 1 and the second material 2 is changed, thereby changing the viewing angle. By using the anti-peep structure provided by the embodiment of the present disclosure, the viewing angle of the light outgoing surface can be controlled to change within a range of ±5° to ±90° (i.e., 10°-180°).

According to an embodiment of the present disclosure, when the anti-peep function of the display device is desired to be turned off, only a certain driving voltage is needed to be applied between two sides of the second material 2, e.g., a driving voltage of ±(1-50) volts, to make the second refractive index of the second material 2 equal to the first refractive index of the first material of the substrate 1; and when the anti-peep function is desired to be turned on, the driving voltage of the second material 2 is adjusted by the transparent electrode to change the second refractive index so that the photonic crystal effect occurs, and the viewing angle is correspondingly reduced. In addition, the degree of reduction of the viewing angle may be adjusted by applying different driving voltages, thereby achieving different levels of the anti-peep function.

According to an embodiment of the present disclosure, the display device may include the anti-peep structure of the above embodiments. The display device may be a liquid crystal display panel, an electronic paper, an OLED panel, a mobile phone, a tablet, a television, a display, a laptop, a digital photo frame, a navigator, and the like, or any product or component having a display function.

It should be understood that the above implementations are merely exemplary for the purpose of illustrating principles of the present disclosure; however, the present disclosure is not limited thereto. It will be apparent to those skilled in the art that various changes and modifications can be made without departing from the spirit and essence of the present disclosure, and these changes and modifications are deemed as falling within the scope of the present disclosure.

What is claimed is:

1. An anti-peep structure, based on a principle of optical waveguide of two-dimensional photonic crystals, comprising:
    a substrate made of a first material with a first refractive index, comprising a light incident surface and a light outgoing surface disposed opposite to each other, wherein a plurality of grooves are disposed in the substrate at a side of the light incident surface or the light outgoing surface;
    a second material with a second refractive index disposed in the plurality of grooves; and
    a refractive index regulating component configured to control the second refractive index;
    wherein a viewing angle at the light outgoing surface is determined by a difference between the first refractive index and the second refractive index;
    wherein projections of the plurality of grooves on the light outgoing surface are parallel to each other; and
    wherein in a direction that the plurality of grooves are sequentially arranged, any one of the plurality of grooves has a dimension ranging from 30 nm to 210 nm, and a distance between any two adjacent grooves of the plurality of grooves ranges from 20 nm to 200 nm; and in a direction perpendicular to the light outgoing surface, any one of the plurality of grooves has a dimension ranging from 50 μm to 200 μm, and in the direction that the plurality of grooves are sequentially arranged, the dimension of the groove and the distance between any two adjacent grooves are in the same order of magnitude as an incident light wavelength for realizing a photonic crystal effect.

2. The anti-peep structure according to claim 1, wherein the first material comprises any one of an acrylic material, polyethylene terephthalate (PET), and glass.

3. The anti-peep structure according to claim 1, wherein the second material comprises a liquid crystal material.

4. The anti-peep structure according to claim 1, wherein the refractive index regulating component comprises a first transparent electrode and a second transparent electrode respectively disposed on the substrate at the side of the light incident surface and the side of the light outgoing surface; and the second refractive index is determined by a voltage between the first transparent electrode and the second transparent electrode.

5. The anti-peep structure according to claim 4, wherein an enclosed structure is formed by the plurality of grooves and one of the first transparent electrode and the second transparent electrode to seal the second material.

6. The anti-peep structure according to claim 1, wherein the first material comprises a resin transparent material, and the first refractive index ranges from 1.2 to 3.5; and the difference between the first refractive index and the second refractive index ranges from 0 to 2.

7. The anti-peep structure according to claim 1, wherein the plurality of grooves are disposed on the light incident surface of the substrate.

8. A display device comprising the anti-peep structure according to claim 1 and a display screen, wherein the anti-peep structure is attached to the display screen.

9. The display device according to claim 8, wherein the anti-peep structure is attached to the display screen along an upward and downward direction of the display screen in which the plurality of grooves are sequentially arranged.

10. A method for manufacturing an anti-peep structure, based on a principle of optical waveguide of two-dimensional photonic crystals, comprising:

forming a plurality of grooves in a substrate at a first side where a light incident surface or a light outgoing surface is located, the substrate being made of a first material having a first refractive index;

filling the plurality of grooves with a second material having a second refractive index; and forming a refractive index regulating component such that the refractive index regulating component is configured to control the second refractive index, and a viewing angle at the light outgoing surface is determined by a difference between the first refractive index and the second refractive index;

wherein projections of the plurality of grooves on the light outgoing surface are parallel to each other; and in a direction that the plurality of grooves are sequentially arranged, any one of the plurality of grooves has a dimension ranging from 30 nm to 210 nm, and a distance between any two adjacent grooves of the plurality of grooves ranges from 20 nm to 200 nm; and in a direction perpendicular to the light outgoing surface, any one of the plurality of grooves has a dimension ranging from 50 μm to 200 μm, and in the direction that the plurality of grooves are sequentially arranged, the dimension of the grooves and the distance between any two adjacent grooves are in the same order of magnitude as an incident light wavelength for realizing a photonic crystal effect.

11. The method for manufacturing the anti-peep structure according to claim 10, wherein the first material comprises any one of an acrylic material, polyethylene terephthalate (PET), and glass; and the second material comprises a liquid crystal material.

12. The method for manufacturing the anti-peep structure according to claim 10, wherein forming the plurality of grooves in the substrate at a side where the light incident surface or the light outgoing surface is located comprises: forming the plurality of grooves on the light incident surface or the light outgoing surface by a Nano-imprint process.

13. The method for manufacturing the anti-peep structure according to claim 10, wherein filling the plurality of grooves with the second material comprises: filling the plurality of grooves with the second material by a vacuum drip irrigation process.

14. The method for manufacturing the anti-peep structure according to claim 10, wherein forming the refractive index regulating component comprises:

forming a first transparent electrode at the first side on the substrate to seal the second material; and forming a second transparent electrode on the substrate at a second side opposite to the first side.

15. The method for manufacturing the anti-peep structure according to claim 14, wherein a material of the first transparent electrode and the second transparent electrode is indium tin oxide (ITO).

16. A method for manufacturing an anti-peep structure, based on a principle of optical waveguide of two-dimensional photonic crystals, comprising:

forming a first transparent electrode on a substrate at a first side, the substrate being made of a first material having a first refractive index;

forming a plurality of grooves in the substrate at a second side opposite to the first side;

filling the plurality of grooves with a second material having a second refractive index; and forming a second transparent electrode on the substrate to seal the second material;

wherein the first transparent electrode and the second transparent electrode are configured to generate an electric field to control the second refractive index, and a viewing angle of the anti-peep structure is determined by a difference between the first refractive index and the second refractive index;

wherein projections of the plurality of grooves on a surface where the first transparent electrode is located are parallel to each other; and in a direction that the plurality of grooves are sequentially arranged, any one of the plurality of grooves has a dimension ranging from 30 nm to 210 nm, and a distance between any two adjacent grooves of the plurality of grooves ranges from 20 nm to 200 nm; and in a direction perpendicular to the surface where the first transparent electrode is located, any one of the plurality of grooves has a dimension ranging from 50 μm to 200 μm, and in the direction that the plurality of grooves are sequentially arranged, the dimension of the groove and the distance between any two adjacent grooves are in the same order of magnitude as an incident light wavelength for realizing a photonic crystal effect.

* * * * *